March 17, 1925.
M. SIKORA
LOCKING MEANS FOR DEMOUNTABLE RIMS
Filed Aug. 27, 1924
1,530,425
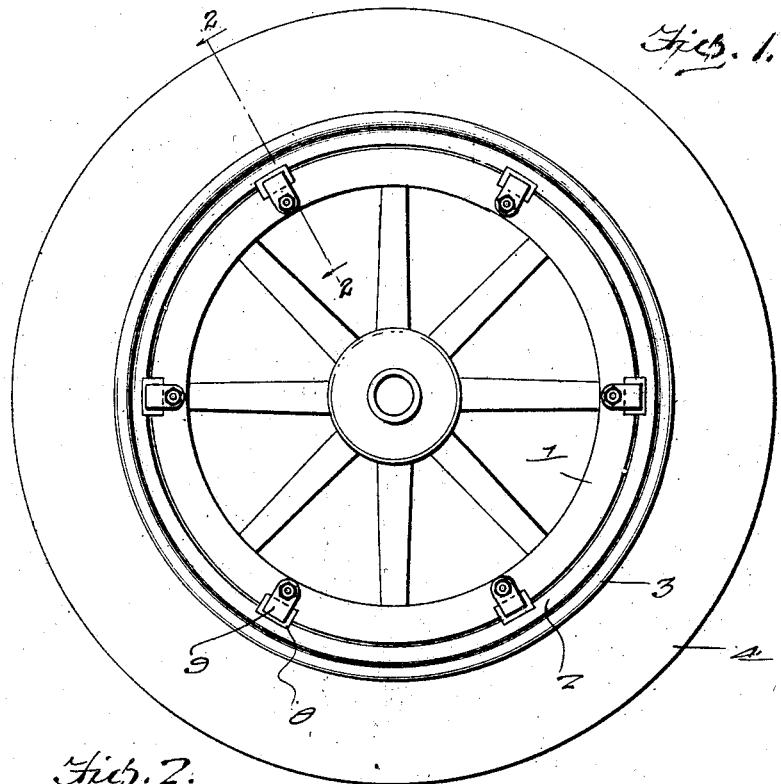
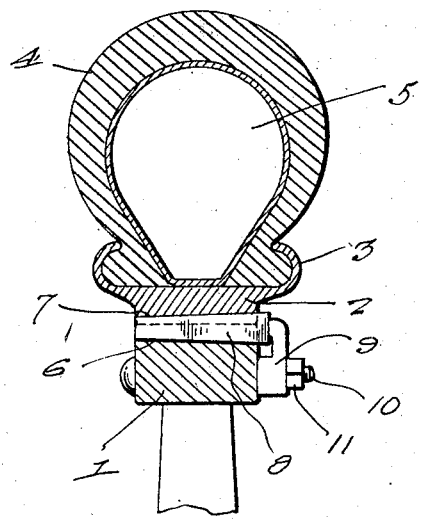
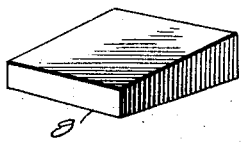
Inventor
M. Sikora
By Clarence A. O'Brien
Attorney Patented Mar. 17, 1925.

1,530,425

UNITED STATES PATENT OFFICE.

MIKE SIKORA, OF ROBINS, OHIO.

LOCKING MEANS FOR DEMOUNTABLE RIMS.

Application filed August 27, 1924. Serial No. 734,482.

*To all whom it may concern:*

Be it known that I, MIKE SIKORA, a citizen of the United States, residing at Robins, in the county of Guernsey and State of Ohio, have invented certain new and useful Improvements in a Locking Means for Demountable Rims, of which the following is a specification.

This invention relates to improvements in means for locking demountable rims on the felly of a vehicle wheel in such a manner as to prevent any possibility of the rim from moving circumferentially on the felly thus preventing any possiblity of the valve stem becoming broken.

Another important object of the present invention is to provide a locking means for demountable rims of the above mentioned character, which may be readily and easily inserted in position between the rim and the felly of the vehicle wheel, additional means being provided for securing the locking means in place against accidental disengagement.

A still further object of the invention is to provide a locking means for demountable rims of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this application and in which like numerals designate like parts throughout the same:

Figure 1 is an elevational view of a vehicle wheel showing my invention associated therewith.

Figure 2 is a sectional view taken approximately on line 2—2 of Figure 1, and

Figure 3 is a detail perspective view of the locking member.

In the drawing wherein for the purpose of illustration is shown the preferred embodiment of my invention, the numeral 1 designates a felly of a vehicle wheel. The rim 2 which is adapted to be demountably supported on the felly is provided with the usual flanges 3 for supporting the casing 4 and the pneumatic inner tube 5 of a pneumatic tire on the rim in the usual manner.

The adjacent faces of the felly and rim are provided with registering grooves at spaced intervals such as are shown at 6 and 7 in the drawing. These grooves taper gradually from one side of the felly and rim respectively to the opposite side thereof to provide tapered sockets or pockets for the purposes to be presently described.

Adapted to be driven in each of the sockets or pockets formed by the registering grooves between the felly and the rim is the wedge shaped key or block 8. Each of the locking keys is held in position in its respective socket by means of a cooperating lug 9 which is supported on the threaded end of a bolt 10 which extends through the felly 1. The nut 11 is provided for securing the lug on the threaded end of the bolt and the manner in which the keys or blocks are secured in locked engagement with the felly and rim is clearly illustrated in Figures 1 and 2 of the drawing.

When the parts are arranged as shown in the drawing, the rim will be prevented from moving circumferentially around the felly thereby preventing any possibility of the valve stem becoming broken as frequently happens with the demountable rims and fastening means now in use on pneumatic tire wheels. The provision of the locking keys or blocks also will eliminate to an appreciable extent a lot of unnecessary noise caused by the swinging between the rim and the felly with the retaining lugs now in use.

The simplicity in which my device is constructed enables the parts to be readily assembled or disassembled as the case may be. The provision of the locking block retaining lugs furthermore prevents any possibility of the same becoming disengaged from the sockets in which the same are wedged and thereby will hold the rim and the pneumatic tire thereon in a rigid position on the felly of the wheel.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In a structure of the class described, a wheel felly, and a rim mounted thereon, the meeting faces of the rim and felly having transversely extending registering grooves extending from side to side and forming open ended sockets, said sockets being polygonal in cross section, and arranged at spaced intervals around the circumference of the felly and rim, a wedge-block removably fitted into each socket and having its ends exposed at each end of the socket, said wedge being of a size and shape to snugly fit within the socket, bolts extending transversely through the felly, lugs fitted upon the threaded ends of the bolts and engaged with said wedge blocks, and retaining nuts for said lugs.

In testimony whereof I affix my signature.

MIKE SIKORA.